No. 764,887. PATENTED JULY 12, 1904.
R. H. GOLDSBOROUGH.
TURBINE.
APPLICATION FILED FEB. 27, 1904.
NO MODEL. 5 SHEETS—SHEET 1.

Witnesses
Inventor
Richard H. Goldsborough.
By G. Ayres.
Attorney

No. 764,887. PATENTED JULY 12, 1904.
R. H. GOLDSBOROUGH.
TURBINE.
APPLICATION FILED FEB. 27, 1904.
NO MODEL. 5 SHEETS—SHEET 2.
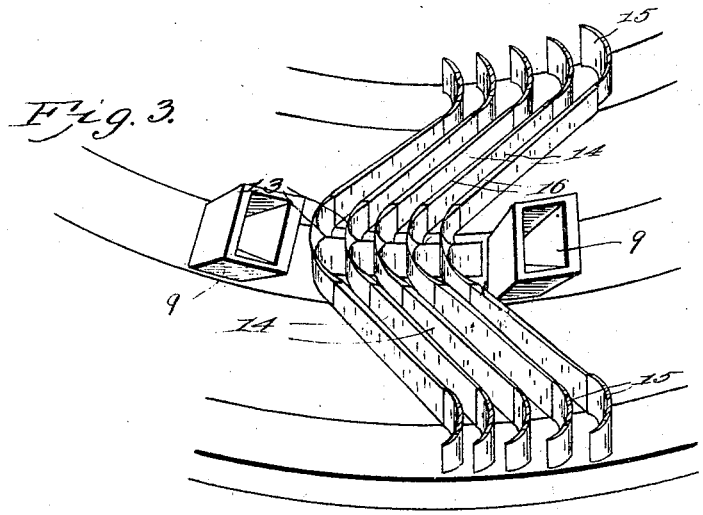
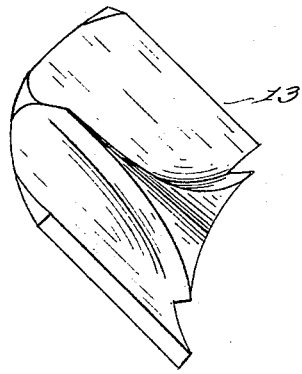
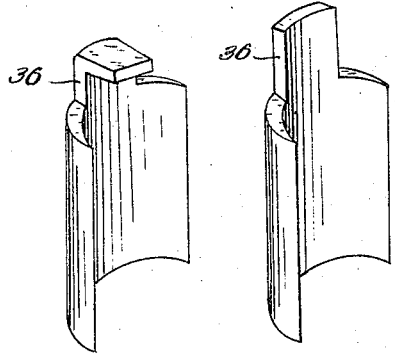
Witnesses
Inventor
Richard H. Goldsborough.
By
G. Ayres.
Attorney No. 764,887. PATENTED JULY 12, 1904.
R. H. GOLDSBOROUGH.
TURBINE.
APPLICATION FILED FEB. 27, 1904.
NO MODEL. 5 SHEETS—SHEET 3.

Witnesses
Inventor
Richard H. Goldsborough.
By
G. Ayres.
Attorney

No. 764,887. PATENTED JULY 12, 1904.
R. H. GOLDSBOROUGH.
TURBINE.
APPLICATION FILED FEB. 27, 1904.
NO MODEL. 5 SHEETS—SHEET 4.
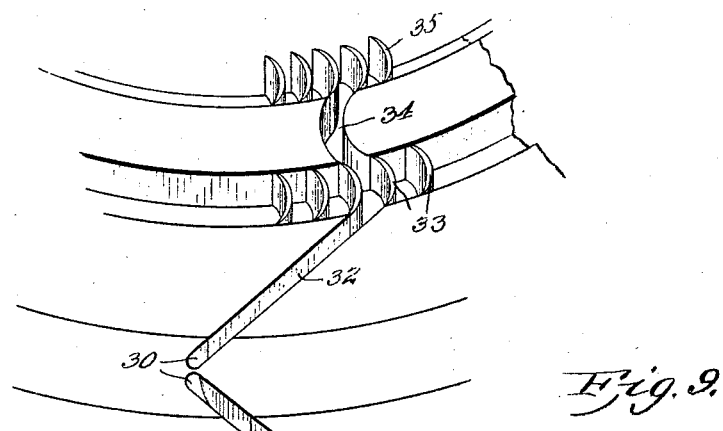
Fig. 9.
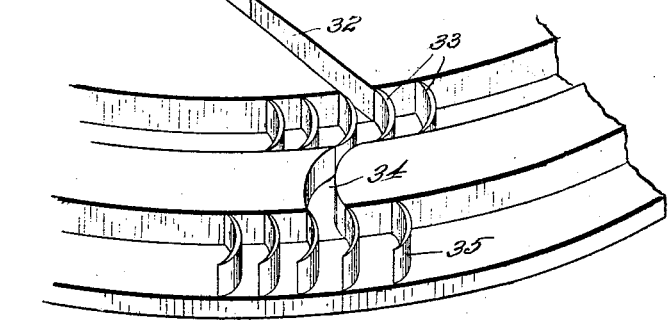
Fig. 10.  Fig. 11.  Fig. 12.
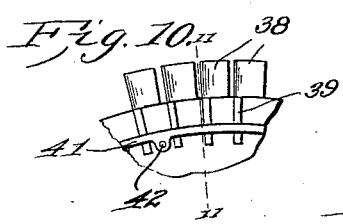
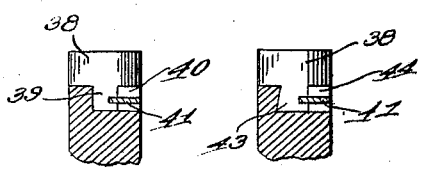
Fig. 13.  Fig. 14.
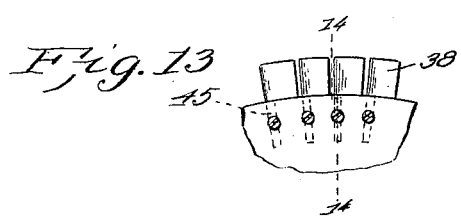
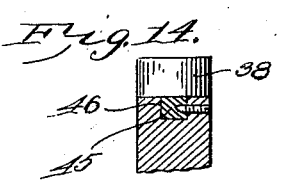
Inventor
Richard H. Goldsborough.
Witnesses
L. Armstrong.
Eugene M. Sliney.
By G. Ayres.
Attorney

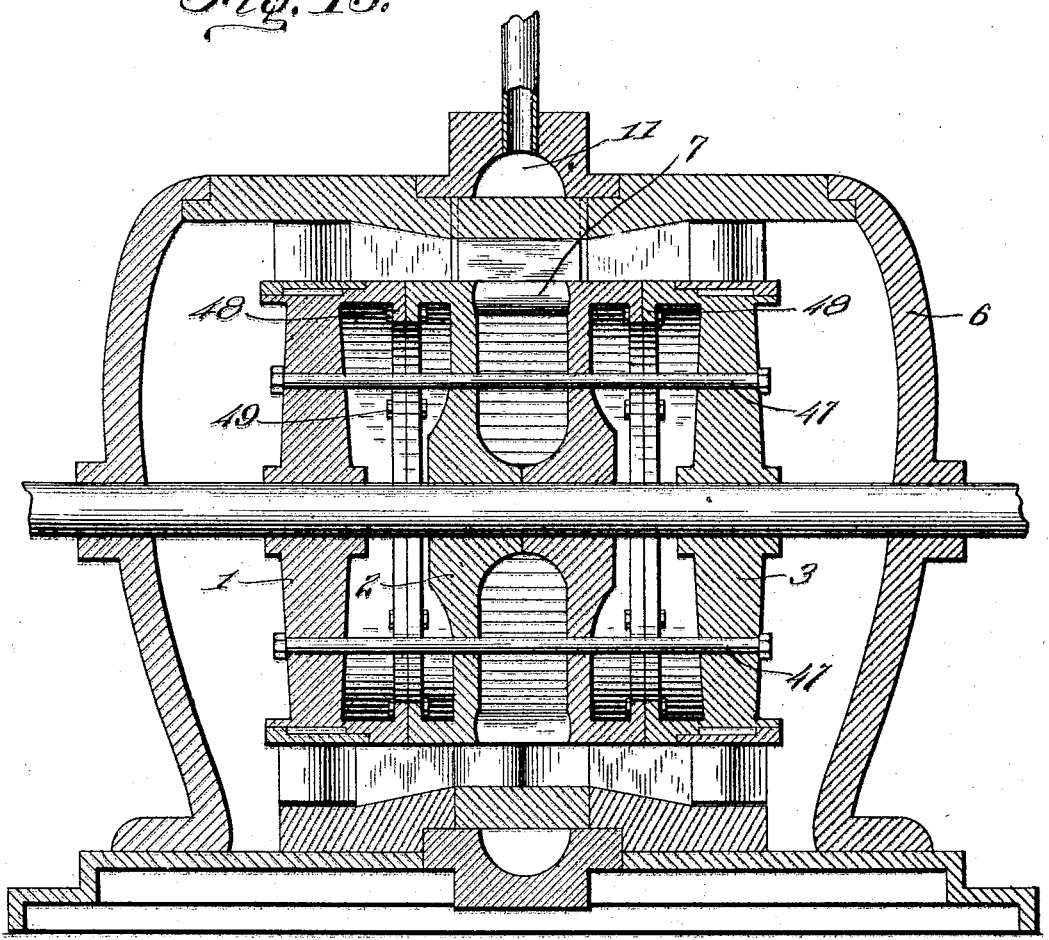

No. 764,887.

Patented July 12, 1904.

UNITED STATES PATENT OFFICE.

RICHARD H. GOLDSBOROUGH, OF WASHINGTON, DISTRICT OF COLUMBIA.

TURBINE.

SPECIFICATION forming part of Letters Patent No. 764,887, dated July 12, 1904.

Application filed February 27, 1904. Serial No. 195,562. (No model.)

*To all whom it may concern:*

Be it known that I, RICHARD H. GOLDSBOROUGH, a citizen of the United States, residing at Washington, in the District of Columbia, have invented new and useful Improvements in Turbines, of which the following is a specification.

My invention relates to compound types of turbine-motors; and it consists in the constructions, combinations, and arrangements herein described and claimed.

The objects of my invention are to provide a perfectly-balanced construction in which the heat energy will be efficiently transformed into kinetic energy and the latter advantageously employed at a low peripheral speed of the motor.

Figure 1:
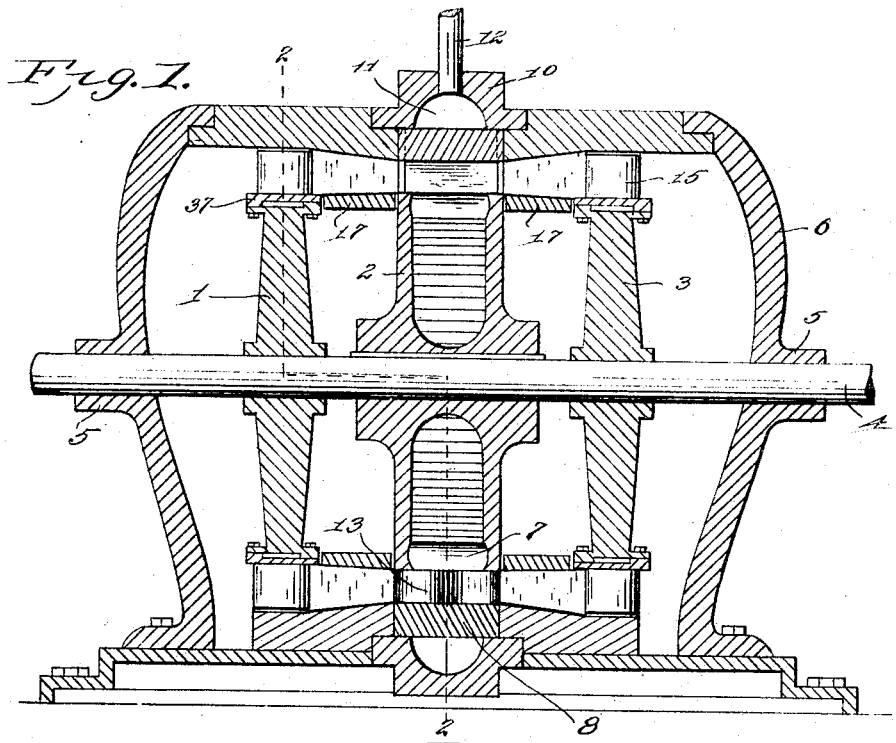
Figure 2:
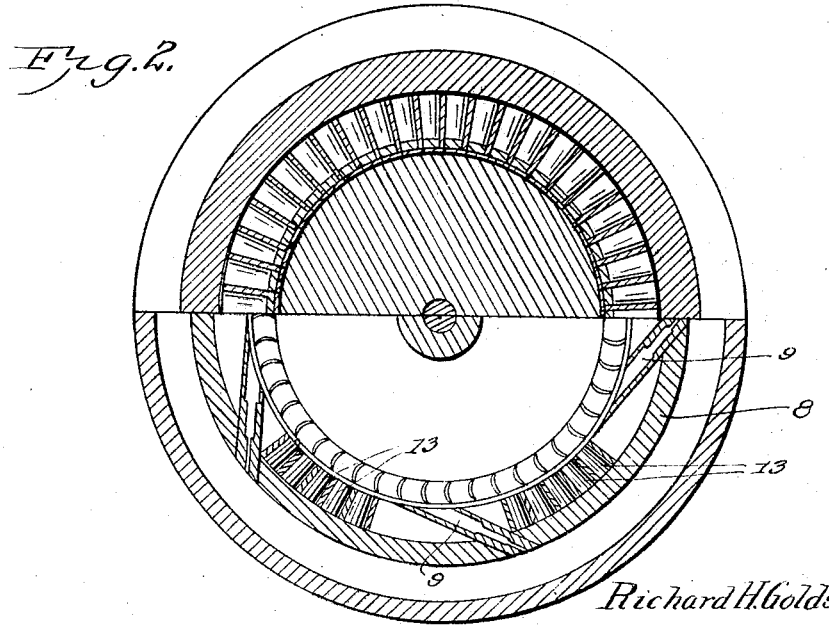
Figures 7, 8:
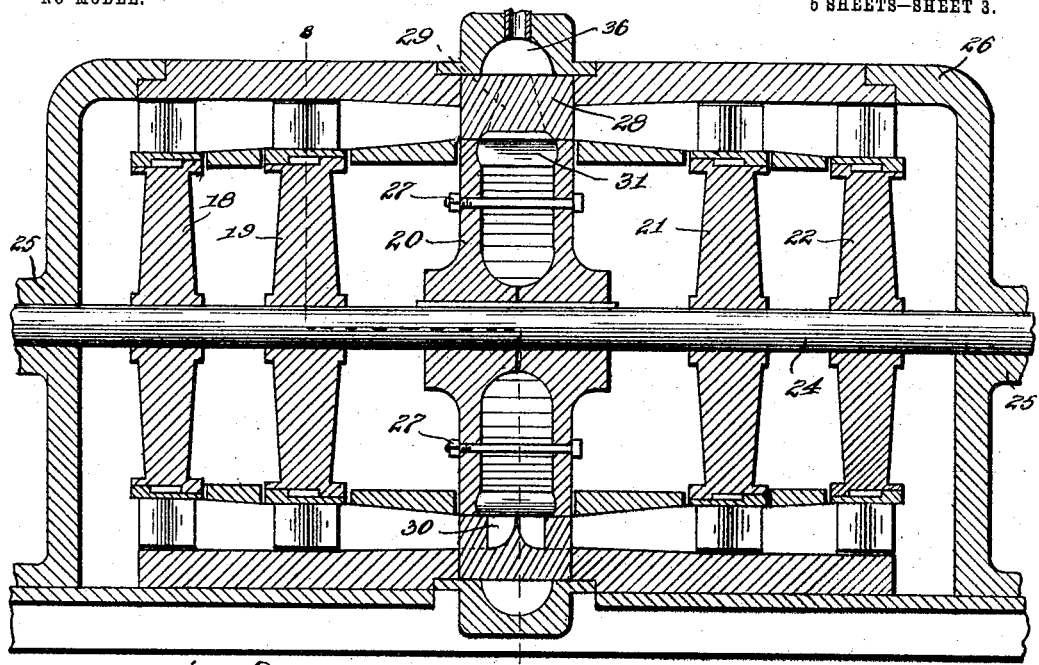

Referring to the accompanying drawings, forming a part of this application, in which similar reference-numerals indicate corresponding parts in the several views, Figure 1 is an axial vertical sectional view illustrating one embodiment of my invention. Fig. 2 is a sectional view on the line 2 2 of Fig. 1. Fig. 3 is a detail perspective view illustrating the arrangement of the abutments, the inclined ports, and the turbine-vanes. Fig. 4 is a detail perspective view, on a larger scale, clearly illustrating a preferred form of abutment. Fig. 5 is a detail perspective view showing one of the vanes provided with an extension bent for securing it to the turbine-wheel. Fig. 6 is a view similar to Fig. 5, showing the vane as formed. Fig. 7 is an axial vertical sectional view illustrating a modified construction of multiple-compound turbine-motor. Fig. 8 is a sectional view on the line 8 8 of Fig. 7. Fig. 9 is a detail perspective view illustrating one of the exhaust-ports, the lateral inclined ports, and the turbine-vanes of the multiple-compound construction. Fig. 10 is a detail side elevation showing one means of securing the vanes to the periphery of the turbine-wheel. Fig. 11 is a detail sectional view on the line 11 11 of Fig. 10. Fig. 12 is a view similar to Fig. 11, illustrating a slightly-modified construction. Fig. 13 is a detail side elevation illustrating an alternative way for securing the vanes to the periphery of the turbine-wheel. Fig. 14 is a sectional view on the line 14 14 of Fig. 13. Fig. 15 is a sectional view showing a modification.

Referring especially to Figs. 1, 2, and 3 of the drawings, 1, 2, and 3 indicate turbine-wheels secured to a common shaft 4, which latter is suitably journaled at 5 in the turbine-casing 6. The wheel 2 is shown provided with an annular series of vanes 7, which are preferably arranged with their outer edges lying in the periphery of the wheel. The wheel 2 may be formed of one integral part, as shown, or of separate parts secured together to facilitate clamping the vanes in position. An annular member 8, surrounding the periphery of the wheel 2, is spaced therefrom and carries a plurality of divergent ports 9, which latter extend across said space, with their discharge ends in operative relation to the vanes of the wheel 2. An outer ring or annular member 10 is provided with a chamber 11, arranged in communication with the admission ends of the inclined ports 9, and a pipe 12 is provided for maintaining steam or other fluid medium at any desired pressure within the chamber 11. A plurality of stationary abutments 13 are arranged about the outer periphery of the annular series of vanes 7 at points intermediary of the several inclined ports 9 and are constructed to deflect the fluid medium discharged from said vanes laterally toward each side thereof. A series of ports 14, arranged at each side of said abutments, are constructed to receive the discharge therefrom and to direct the same against the annular series of vanes 15, carried by the turbine-wheels 1 and 3. These ports are inclined forwardly in the direction of rotation of the turbine-wheel, as clearly shown in Fig. 3. The stationary abutments 13 are preferably tapered to substantially a knife-edge adjacent the vanes 7 and may be carried by the annular member 8 or may constitute parts of the walls 16 of the lateral ports 14. The ports 14 are shown with their upper and lower sides closed, respectively, by the turbine-casing and by annular members 17.

In the operation of the above-described construction the actuating medium, maintained at any desired pressure within the chamber 11, expands in passing through the divergent ports 9 and impinges against the vanes 7 at a high velocity. If desired, the parts can be so constructed that practically the entire expansion of the fluid medium will take place during its passage through the divergent ports 9; but under certain practical conditions it will be found advantageous to employ a series of partial expansions of the actuating medium. This can be provided for by forming the lateral ports 14 with diverging walls, as clearly shown in Figs. 1 and 3. The vanes 7 are preferably so shaped as to cause a practical reversal in the flow of the actuating medium impacting thereon and to deflect the same to the interior of the wheel 2 in a rearward direction past the adjacent stationary abutments 13. The actuating medium deflected from the vanes in seeking the path of least pressure will recurve and flow from the interior of the wheel 2 through the vanes 7 against the stationary abutments 13. The stationary abutments are shown formed on the Pelton bucket principle and are preferably constructed to gradually and uniformly deflect the actuating medium into the inclined ports 14, from which it is discharged at an efficient angle against the turbine-vanes 15 of the wheels 1 and 3.

The above construction provides a simple and perfectly-balanced means for efficiently utilizing the energy of the actuating medium at a comparatively low peripheral speed of the motor.

Referring especially to Figs. 7, 8, and 9, which illustrate a multiple-compound construction, the wheels 18, 19, 20, 21, and 22 are secured on a common shaft 24, suitably journaled at 25 in the turbine-casing 26. The wheel 20 is formed of two parts secured together by bolts 27 and is otherwise exactly similar to the wheel 2, above described. The wheels 18, 19, 20, 21, and 22 are identical in form and construction with the wheels 1 and 3, previously described. An annular member 28, closely surrounding the periphery of the wheel 20, is provided with a plurality of divergent ports 29 and with exhaust-ports 30, arranged intermediate thereof. The exhaust-ports are arranged to receive the fluid medium discharged from the interior of the wheel 20 through the vanes 31 and are preferably constructed to uniformly and gradually deflect said medium laterally in both directions, as clearly shown in Figs. 7 and 9. Lateral ports 32, shown extending forwardly in the direction of rotation of the turbine, are constructed to lead the fluid medium from the exhaust-ports and to direct said medium at an efficient angle against the series of vanes 33, carried by the wheels 19 and 21. The vanes 33 are preferably constructed to cause a practical reversal in the flow of the medium impacting thereon and to discharge the same into ports 34, which latter are constructed to direct the fluid medium at an efficient angle against the series of vanes 35, carried by the wheels 18 and 22. The relative arrangement of the discharge ends of ports 32 and admission ends of the corresponding ports 34 can be varied to suit the practical conditions under which the motor is operated. The arrangement illustrated is that preferred for the comparatively low peripheral speed for which my motor is designed, and for relatively high speeds the entrance ends of the ports 34 can be advantageously shifted slightly past the discharge ends of the ports 32 in the direction of the motor's rotation.

In the operation of the multiple-compound construction the steam or other fluid medium is maintained at any desired pressure in an annular chamber 36. From the chamber 36 the steam expands in flowing through the divergent nozzles 39 and impinges against the vanes 31 at a high velocity. The vanes 31 are preferably constructed to cause a practical reversal in the flow of the medium impacting thereon and to deflect said medium into the interior of the wheel rearwardly past the next succeeding exhaust-ports. The medium deflected from the vanes in seeking the path of least resistance flows from the interior of the wheel through the vanes 31 to the exhaust-ports 30 and is directed by the latter to the forwardly-inclined lateral ports 32. The lateral ports 32 direct the steam at an efficient angle against the series of vanes 33, which cause a practical reversal in its flow and discharge it into the ports 34. The steam received by the ports 34 is directed at an efficient angle against the series of vanes 35, from which it is finally deflected into the turbine-casing. The turbine-casing may be arranged in free communication with the atmosphere or with a condenser, or it may constitute a condenser by the addition of the usual cold-water pipes or water-sprays. In this multiple-compound construction the parts are preferably so proportioned that the actuating medium undergoes a partial expansion prior to each succeeding impact; but obviously substantially the entire range of expansion could be obtained in the divergent ports 29 prior to the first impact, if desired. This multiple-compound modification provides a perfectly-balanced construction in which any tendency of the shaft to oscillate or buckle will be resisted by the action of the fluid medium and in which the degree of compounding can be conveniently extended to any desired limit.

Figs. 1, 2, 5, and 6 illustrate a preferred means for securing the vanes 15 to the periphery of the turbine-wheel. In this construction the vanes are provided with extensions 36, adapted to be inserted through slots in a ring 37 and bent against the inner surface of the said ring. The ring 37, carrying the series of vanes, is suitably secured on the periphery of the turbine-wheel, the latter being formed with a recess for receiving the bent portions of said extensions 36, thus providing a very convenient and inexpensive means for accurately spacing the vanes and rigidly securing them to the periphery of the turbine-wheel.

In the modification shown in Figs. 10 and 11 the turbine-vanes 38 are provided with notched extensions 39, which are adapted to fit in the slots 40, cast or otherwise suitably formed in the periphery of the turbine-wheel. A ring member 41, fitting an annular slot in one side of the turbine-wheel, engages the notches in the several extensions 39 and is secured in place by any suitable means, as by screws 42.

Fig. 12 illustrates a slightly-modified construction in which the vanes 38 are provided with beveled extensions 43, adapted to be engaged by the inclined ends of the slots 44, formed in the turbine-wheel.

Figs. 13 and 14 illustrate a further modification, in which the vanes 38 are provided with notched extensions 45, constructed to closely fit recesses 46, formed in the periphery of the turbine-wheel. In this construction a single ring can be employed for clamping the several vanes, as shown in Fig. 10, or each vane can be secured by an independent screw, as shown in Figs. 13 and 14.

Fig. 15 illustrates a construction similar to that of Fig. 1, in which the several turbine-wheels 1, 2, and 3 are rigidly secured together by bolts 47 passing through the wheels and by additional bolts 49 through annular flanges formed on the wheels at 48. This modification obviates the necessity of employing the annular members 17 of the construction illustrated in Fig. 1 for closing the inner portions of the annular series of ports 14, thus removing all danger of any leakage about the edges of such annular closing members. It is obvious that the several wheels could be secured together by other means than those shown, or they could be constructed of a single integral part, if desired.

Having thus described my invention, what I claim as new, and desire to secure by Letters Patent, is—

1. In a compound turbine, the combination of a shaft, a hollow wheel secured thereon, an annular series of vanes carried by said wheel, means constructed to direct a fluid medium through said annular series of vanes to the interior of said wheel, means constructed to lead the fluid medium from the interior of said wheel through the vanes and to deflect such fluid medium laterally, a plurality of ports arranged to receive such laterally-deflected fluid medium, and a turbine-wheel secured to said shaft and carrying curved vanes on its periphery adjacent the discharge ends of said plurality of ports, substantially as described.

2. In a compound turbine, the combination of a shaft, a hollow wheel secured thereon, an annular series of vanes carried by said wheel, means constructed to direct a fluid medium through said annular series of vanes to the interior of said wheel, means constructed to lead the fluid medium from the interior of said wheel through the vanes and to deflect such fluid medium laterally, a plurality of divergent ports arranged to receive such laterally-deflected fluid medium, and a turbine-wheel secured to said shaft and carrying curved vanes on its periphery adjacent the discharge ends of said plurality of ports, substantially as described.

3. In a compound turbine, the combination of a shaft, a hollow wheel secured thereon, an annular series of vanes carried by said wheel, means constructed to direct a fluid medium through said annular series of vanes to the interior of said wheel, means constructed to lead the fluid medium from the interior of said wheel through the vanes and to laterally deflect such fluid medium in both directions, a plurality of ports arranged to receive such laterally-deflected fluid medium, and turbine-wheels secured to said shaft and carrying vanes on their peripheries adjacent the discharge ends of said series of ports, substantially as described.

4. In a compound turbine, the combination of a shaft, a hollow wheel secured thereon, an annular series of vanes carried by said wheel, means constructed to direct a fluid medium through said annular series of vanes to the interior of said wheel, means constructed to lead the fluid medium from the interior of said wheel through the vanes and to laterally deflect such fluid medium in both directions, a plurality of divergent ports arranged to receive such laterally-deflected fluid medium, and turbine-wheels secured to said shaft and carrying vanes on their peripheries adjacent the discharge ends of said series of ports, substantially as described.

5. In a compound turbine, the combination of a shaft, a hollow wheel secured thereon, an annular series of vanes carried by said wheel with their outer edges lying substantially in the periphery thereof, said wheel constructed to close the ends of the spaces between the several vanes, means constructed to direct a fluid medium through said annular series of vanes to the interior of said wheel, means constructed to lead the fluid medium from the interior of said wheel through the vanes and to laterally deflect such fluid medium in both directions, a plurality of divergent ports arranged to receive such laterally-deflected fluid medium, and turbine-wheels secured to said shaft and carrying vanes on their peripheries adjacent the discharge ends of said series of ports, substantially as described.

6. In a compound turbine, the combination of a shaft, a hollow wheel secured thereon, an annular series of vanes carried by said wheel, a plurality of divergent ports arranged uniformly about said wheel and constructed to direct a fluid medium through said vanes to the interior of the wheel, means constructed to lead the fluid medium from the interior of said wheel through the vanes and to laterally deflect such fluid medium in both directions, a plurality of divergent ports arranged to receive such laterally-deflected fluid medium, and turbine-wheels secured to said shaft and carrying vanes on their peripheries adjacent the discharge ends of said series of ports, substantially as described.

7. In a compound turbine, the combination of a shaft, a hollow wheel secured thereon, an annular series of vanes carried by said wheel, a plurality of divergent ports arranged uniformly about said wheel and constructed to direct a fluid medium through said vanes to the interior of the wheel, a common chamber communicating with each of said ports, means constructed to maintain a fluid medium under pressure in said chamber, means constructed to lead the fluid medium from the interior of said wheel through the vanes and to laterally deflect such fluid medium in both directions, a plurality of divergent ports arranged to receive such laterally-deflected fluid medium, and turbine-wheels secured to said shaft and carrying vanes on their peripheries adjacent the discharge ends of said series of ports, substantially as described.

8. In a compound turbine, the combination of a shaft, a hollow wheel secured thereon, an annular series of vanes carried by said wheel, a plurality of admission-ports arranged uniformly about said wheel and constructed to direct a fluid medium through said vanes to the interior of the wheel, a plurality of exhaust-ports arranged about said wheel intermediate of said admission-ports and constructed to lead the fluid medium from the interior of the wheel through the annular series of vanes and to laterally deflect such fluid medium, a series of ports arranged to receive such laterally-deflected fluid medium, and a turbine-wheel secured to said shaft and carrying vanes on its periphery adjacent the discharge ends of said series of ports, substantially as described.

9. In a compound turbine, the combination of a shaft, a hollow wheel secured thereon, an annular series of vanes carried by said wheel, a plurality of admission-ports arranged uniformly about said wheel and constructed to direct a fluid medium through said vanes to the interior of the wheel, a plurality of exhaust-ports arranged about said wheel intermediate of said admission-ports and constructed to lead the fluid medium from the interior of the wheel through the annular series of vanes and to deflect such fluid medium laterally in both directions, a series of ports arranged to receive such laterally-deflected fluid medium, and turbine-wheels secured to said shaft and carrying curved vanes on their peripheries adjacent the discharge ends of said series of ports, substantially as described.

10. In a compound turbine, the combination of a shaft, a hollow wheel secured thereon, an annular series of vanes carried by said wheel, a plurality of admission-ports arranged uniformly about said wheel and constructed to direct a fluid medium through said vanes to the interior of the wheel, a plurality of exhaust-ports arranged about said wheel intermediate of said admission-ports and constructed to lead the fluid medium from the interior of the wheel through the annular series of vanes and to deflect such fluid medium laterally in both directions, a series of divergent ports arranged to receive such laterally-deflected fluid medium, and turbine-wheels secured to said shaft and carrying vanes on their peripheries adjacent the discharge ends of said series of ports, substantially as described.

11. In a compound turbine, the combination of a shaft, a hollow wheel secured thereon, an annular series of vanes carried by said wheel, means constructed to direct a fluid medium through said vanes to the interior of said hollow wheel, means constructed to lead the fluid medium from the interior of said wheel through the vanes and to deflect such fluid medium laterally in both directions, a plurality of ports arranged to receive such laterally-deflected fluid medium, turbine-wheels secured to said shaft and carrying curved vanes on their peripheries adjacent the discharge ends of said plurality of ports, a plurality of ports arranged to receive the fluid medium discharged from said curved vanes, and turbine-wheels secured to said shaft and carrying vanes on their peripheries adjacent the discharge ends of said last plurality of ports, substantially as described.

12. In a compound turbine, the combination of a shaft, a hollow wheel secured thereon, an annular series of vanes carried by said wheel, means constructed to direct a fluid medium through said vanes to the interior of said hollow wheel, means constructed to lead the fluid medium from the interior of said wheel through the vanes and to deflect such fluid medium laterally in both directions, a plurality of divergent ports arranged to receive such laterally-deflected fluid medium, turbine-wheels secured to said shaft and carrying curved vanes on their peripheries adjacent the discharge ends of said plurality of ports, a plurality of divergent ports arranged to receive the fluid-medium discharge from said curved vanes, and turbine-wheels secured to said shaft and carrying vanes on their peripheries adjacent the discharge ends of said last plurality of ports, substantially as described.

13. In a turbine-motor, the combination of a turbine-wheel provided with slots extending partially across its periphery, a plurality of vanes carrying extensions constructed to fit said slots, and a common means carried by said wheel and constructed to engage said several extensions to securely lock the plurality of vanes on said wheel, substantially as described.

14. In a turbine-motor, the combination of a turbine-wheel provided with undercut slots extending partially across its periphery, a plurality of vanes carrying beveled extensions constructed to fit said slots, and a common means carried by said wheel and constructed to engage said several extensions to securely lock the plurality of vanes on said wheel, substantially as described.

15. In a turbine-motor, the combination of a wheel provided with slots extending partially across its periphery, a plurality of vanes carrying notched extensions constructed to fit said slots, and a clamping-ring carried by said wheel and constructed to engage said several notched extensions to securely lock the vanes on said wheel, substantially as described.

16. In a turbine-motor, the combination of a turbine-wheel provided with slots extending partially across its periphery, a plurality of vanes carrying notched extensions constructed to fit said slots, a ring carried by said wheel and constructed to engage said several notched extensions to securely lock the vanes on said wheel, and means constructed to secure said ring in its locked position on the wheel, substantially as described.

In testimony whereof I have signed my name to this specification in the presence of two subscribing witnesses.

RICHARD H. GOLDSBOROUGH.

Witnesses:
 THOMAS DURANT,
 G. AYRES.